United States Patent
Kim

(10) Patent No.: US 10,095,183 B2
(45) Date of Patent: Oct. 9, 2018

(54) FULL-COLOR INCOHERENT DIGITAL HOLOGRAPHY

(71) Applicant: UNIVERSITY OF SOUTH FLORIDA, Tampa, FL (US)

(72) Inventor: Myung K. Kim, Tampa, FL (US)

(73) Assignee: University of South Florida, Tampa, FL (US)

( * ) Notice: Subject to any disclaimer, the term of this patent is extended or adjusted under 35 U.S.C. 154(b) by 290 days.

(21) Appl. No.: 14/896,416

(22) PCT Filed: May 28, 2014

(86) PCT No.: PCT/US2014/039737
§ 371 (c)(1),
(2) Date: Dec. 7, 2015

(87) PCT Pub. No.: WO2014/204623
PCT Pub. Date: Dec. 24, 2014

(65) Prior Publication Data
US 2016/0139561 A1  May 19, 2016

Related U.S. Application Data

(60) Provisional application No. 61/837,728, filed on Jun. 21, 2013.

(51) Int. Cl.
*G03H 1/06* (2006.01)
*G03H 1/08* (2006.01)
(Continued)

(52) U.S. Cl.
CPC ............ *G03H 1/0866* (2013.01); *G03H 1/02* (2013.01); *G03H 1/0443* (2013.01); *G03H 1/06* (2013.01);
(Continued)

(58) Field of Classification Search
None
See application file for complete search history.

(56) References Cited

U.S. PATENT DOCUMENTS

| | | |
|---|---|---|
| 3,515,452 A | 6/1970 | Pole |
| 4,067,638 A | 1/1978 | Yano et al. |

(Continued)

FOREIGN PATENT DOCUMENTS

| | | | |
|---|---|---|---|
| WO | 2007115281 | 10/2007 | |
| WO | 2012150472 A1 | 11/2012 | |
| WO | WO 2013086350 A1 * | 6/2013 | ............... G03H 1/06 |

OTHER PUBLICATIONS

International Search Report and Written Opinion of Application No. PCT/US2014/039737 dated Nov. 19, 2014 (15 pages).

(Continued)

*Primary Examiner* — Derek S Chapel
(74) *Attorney, Agent, or Firm* — Thomas | Horstemeyer, LLP

(57) ABSTRACT

In one embodiment, a color holographic image is created by generating a separate complex hologram for each of multiple different colors of an object field illuminated with incoherent light, combining the separate complex holograms to obtain a color complex hologram, and generating a reconstructed color holographic image of the object field.

11 Claims, 6 Drawing Sheets

(51) Int. Cl.
  *G03H 1/02* (2006.01)
  *G03H 1/26* (2006.01)
  *G03H 1/04* (2006.01)
  *G03H 1/22* (2006.01)

(52) U.S. Cl.
  CPC ... *G03H 1/2645* (2013.01); *G03H 2001/0212* (2013.01); *G03H 2001/0436* (2013.01); *G03H 2001/0452* (2013.01); *G03H 2001/0458* (2013.01); *G03H 2001/0883* (2013.01); *G03H 2001/2271* (2013.01); *G03H 2001/266* (2013.01); *G03H 2001/2675* (2013.01); *G03H 2222/14* (2013.01); *G03H 2222/17* (2013.01); *G03H 2222/24* (2013.01)

(56) References Cited

U.S. PATENT DOCUMENTS

| | | | |
|---|---|---|---|
| 4,783,133 | A | 11/1988 | Chen |
| 5,022,727 | A | 6/1991 | Smith et al. |
| 5,493,398 | A * | 2/1996 | Pfister ............... G01B 11/2441 356/512 |
| 5,822,066 | A | 10/1998 | Jeong et al. |
| 5,910,839 | A * | 6/1999 | Erskine ................. G01P 3/366 356/28.5 |
| 5,946,077 | A | 8/1999 | Nemirovskiy |
| 7,962,033 | B2 | 6/2011 | Georgiev |
| 8,265,478 | B1 | 9/2012 | Georgiev |
| 8,345,144 | B1 | 1/2013 | Georgiev et al. |
| 8,400,555 | B1 | 3/2013 | Georgiev et al. |
| 9,360,299 | B1 * | 6/2016 | Kim ....................... G01B 9/021 |
| 9,377,758 | B1 * | 6/2016 | Kim ....................... G01B 9/021 |
| 9,417,610 | B1 * | 8/2016 | Kim ....................... G01B 9/021 |
| 2005/0129082 | A1 | 6/2005 | Poppe et al. |
| 2006/0132799 | A1 | 6/2006 | Dubois et al. |
| 2008/0137933 | A1 | 6/2008 | Kim |
| 2009/0041448 | A1 | 2/2009 | Georgiev et al. |
| 2010/0142014 | A1 * | 6/2010 | Rosen ................... G03B 35/02 359/1 |
| 2012/0200901 | A1 * | 8/2012 | Dubois ................. G02B 21/00 359/15 |
| 2012/0281072 | A1 | 11/2012 | Georgiev et al. |

OTHER PUBLICATIONS

Adelson, et al."Single Lens Stereo with a Plenoptic Camera", IEEE transactions on pattern analysis and machine intelligence, vol. 14, No. 2, Feb. 1992.
Stroke, et al., "Holography with spatially non coherent light", Appl. Phys. Lett. 7, 229 (1965); doi: 10.1063/1.1754392.
Lyalikov, "Methods for achieving high measurement sensitivity in holographic interferometry by rewriting holograms using incoherent light", The American Institute of Physics, Technical Physics, vol. 44, No. 12, Dec. 1999.
D. Gabor, A new microscope principle. Nature 161, 777 (1948).
D. Gabor, Microscopy by reconstructed wavefronts. Proc. Roy. Soc. A197, 454 (1949).
E. N. Leith, J. Upatnieks, Wavefront reconstruction with continuous-tone objects. J. Opt. Soc. Am. 53, 1377 (1963).
E. N. Leith, J. Upatnieks, Wavefront reconstruction with diffused illumination and three-dimensional objects. J. Opt. Soc. Am. 54, 1295 (1964).
S. A. Benton, Hologram Reconstructions with Extended Incoherent Sources. Journal of the Optical Society of America 59, 1545 (1969).
S. A. Benton, Holographic displays—a review. Opt. Engg. 14, 402 (1975).
E. N. Leith, Upatniek.J, Holography with Achromatic-Fringe Systems. Journal of the Optical Society of America 57, 975 (1967).
F. Dubois, L. Joannes, J. C. Legros, Improved three-dimensional imaging with a digital holography microscope with a source of partial spatial coherence. Applied Optics 38, 7085 (Dec. 1999).
G. Cochran, New Method of Making Fresnel Transforms With Incoherent Light. Journal of the Optical Society of America 56, 1513 (1966).
S. G. Kim, B. Lee, E. S. Kim, Removal of bias and the conjugate image in incoherent on-axis triangular holography and real-time reconstruction of the complex hologram. Applied Optics 36, 4784 (Jul. 10, 1997).
G. Sirat, D. Psaltis, Conoscopic Holography. Optics Letters 10, 4 (1985).
L. M. Mugnier, G. Y. Sirat, On-axis conoscopic holography without a conjugate image. Opt. Lett. 17, 294 (1992).
T.-C. Poon, M. H. Wu, K. Shinoda, T. Suzuki, Optical scanning holography. Proc. IEEE 84, 753 (1996).
T. C. Poon, Optical Scanning Holography—A Review of Recent Progress. Journal of the Optical Society of Korea 13, 406 (2009).
G. Popescu, T. Ikeda, R. R. Dasari, and M. S. Feld, "Diffraction phase microscopy for quantifying cell structure and dynamics," Opt. Lett. 31(6), 775-777 (2006).
C. Iemmi, A. Moreno, J. Campos, Digital holography with a point diffraction interferometer. Optics Express 13, 1885 (Mar. 2005).
V. Micó, J. Garcia, Z. Zalevsky, and B. Javidi, "Phase-shifting Gabor holography," Opt. Lett. 34(10), 1492-1494 (2009).
J. Rosen, G. Brooker, Digital spatially incoherent Fresnel holography. Optics Letters 32, 912 (Apr. 2007).
J. Rosen, G. Brooker, Fluorescence incoherent color holography. Optics Express 15, 2244 (Mar. 2007).
J. Rosen, G. Brooker, Non-scanning motionless fluorescence three-dimensional holographic microscopy. Nature Photonics 2, 190 (Mar. 2008).
M. K. Kim, Adaptive optics by incoherent digital holography. Optics Letters 37, 2694 (Jul. 1, 2012).
M. K. Kim, Incoherent digital holographic adaptive optics. Appl. Opt. 52, A117 (2013).
I. Yamaguchi, T. Zhang, Phase-shifting digital holography. Optics Letters 22, 1268 (Aug. 15, 1997).
J. Kato, I. Yamaguchi, T. Matsumura, Multicolor digital holography with an achromatic phase shifter. Optics Letters 27, 1403 (Aug. 2002).
J. Rosen, N. Siegel, G. Brooker, Theoretical and experimental demonstration of resolution beyond the Rayleigh limit by FINCH fluorescence microscopic imaging. Optics Express 19, 26249 (Dec. 19, 2011).
M. Levoy, Light fields and computational imaging. Computer 39, 46 (Aug. 2006).
H. W. Babcock, "The possibility of compensating astronomical seeing," Publ. Astron. Soc. Pac. 65, 229-236 (1953).
H. W. Babcock, "Adaptive optics revisited," Science 249, 253-257 (1990).
J. W. Hardy, Adaptive Optics for Astronomical Telescopes (Oxford University, 1998).
J. Porter, Adaptive Optics for Vision Science: Principles, Practices, Design, and Applications (Wiley, 2006).
S. Avino, E. Calloni, J. T. Baker, F. Barone, R. DeRosa, L. DiFiore, L. Milano, and S. R. Restaino, "First adaptive optics control of laser beam based on interferometric phase-front detection," Rev. Sci. Instrum. 76, 083119 (2005).
M. C. Roggemann, B. M. Welsh, and R. Q. Fugate, "Improving the resolution of ground-based telescopes," Rev. Mod. Phys. 69, 437-506 (1997).
C. G. Liu and M. K. Kim, "Digital holographic adaptive optics for ocular imaging: proof of principle," Opt. Lett. 36, 2710-2712 (2011).
M. K. Kim, Digital Holographic Microscopy: Principles, Techniques, and Applications (Springer, 2011).
M. K. Kim, "Principles and techniques of digital holographic microscopy," SPIE Rev. 1, 018005 (2010).
J. Upatnieks, A. V. Lugt, and E. N. Leith, "Correction of lens aberrations by means of holograms," Appl. Opt. 5, 589-593 (1966).
A. V. Lugt, "Signal detection by complex spatial filtering," IEEE Trans. Inf. Theory 10, 139-145 (1964).

(56) References Cited

OTHER PUBLICATIONS

J. Kuhn, F. Charriere, T. Colomb, E. Cuche, F. Montfort, Y. Emery, P. Marquet, and C. Depeursinge, "Axial subnanometer accuracy in digital holographic microscopy," Meas. Sci. Technol. 19, 074007 (2008).
B. Rappaz, A. Barbul, F. Charriere, J. Kuhn, P. Marquet, R. Korenstein, C. Depeursinge, and P. J. Magistretti, "Erythrocytes analysis with a digital holographic microscope," Proc. SPIE 6631, 66310H (2007).
C. J. Mann, L. F. Yu, C.M. Lo, and M. K. Kim, "High-resolution quantitative phase-contrast microscopy by digital holography," Opt. Express 13, 8693-8698 (2005).
L. Miccio, D. Alfieri, S. Grilli, P. Ferraro, A. Finizio, L. De Petrocellis, and S. D. Nicola, "Direct full compensation of the aberrations in quantitative phase microscopy of thin objects by a single digital hologram," Appl. Phys. Lett. 90, 041104 (2007).
T. Colomb, F. Montfort, J. Kuhn, N. Aspert, E. Cuche, A. Madan, F. Charriere, S. Bourquin, P. Marquet, and C. Depeursinge, "Numerical parametric lens for shifting, magnification, and complete aberration compensation in digital holographic microscopy," J. Opt. Soc. Am. A 23, 3177-3190 (2006).
B. Katz, D. Wulich, and J. Rosen, "Optimal noise suppression in Fresnel incoherent correlation holography (FINCH) configured for maximum imaging resolution," Appl. Opt. 49, 5757-5763 (2010).
L. M. Mugnier, G. Y. Sirat, and D. Chariot, "Conoscopic holography: two-dimensional numerical reconstructions," Opt. Lett. 18, 66-68 (1993).
J. Rosen and G. Brooker, "Digital spatially incoherent Fresnel holography," Opt. Lett. 32, 912-914 (2007).
G. Brooker, N. Siegel, V. Wang, and J. Rosen, "Optimal resolution in Fresnel incoherent correlation holographic fluorescence microscopy," Opt. Express 19, 5047-5062 (2011).
R. A. Fisher, Optical Phase Conjugation (Academic Press, 1983).

\* cited by examiner

FULL-COLOR INCOHERENT DIGITAL HOLOGRAPHY

CROSS-REFERENCE TO RELATED APPLICATION(S)

This application is the 35 U.S.C. National Stage of International Application No. PCT/US2014/039737, filed 28 May 2014, which claims the benefit of and priority to U.S. Provisional Application No. 61/837,728, filed on 21 Jun. 2013, herein incorporated by reference in their entireity.

BACKGROUND

While conventional photography records a two-dimensional projection of the intensity profile of an object onto a fixed plane, holography records enough information to enable recreation of the three-dimensional optical field emanating from an object, including both the amplitude and phase of the optical field. The three-dimensional recording is made possible by the interference of the object's optical field with a so-called reference field and therefore requires coherence between the two fields. In the original conception of holography, the reference was realized from a part of the illumination undisturbed by the object. The invention of the laser made it possible to provide the coherent reference field explicitly and with a high degree of freedom in the optical configurations. Three-dimensional holographic images quickly captured the imagination of the general public and lead to a multitude of new technological applications. In such applications, coherence of the reference light was at the core of the holographic principle. Unfortunately, this has been a major impediment to a wider range of applications of holography because it requires special illumination sources, such as lasers, or significantly constraining the optical configurations.

Digital holography is an emergent imaging technology that has been made possible by advances in computing and image sensor technologies. Whereas photography is made faster and more convenient by the digital technologies, the digital implementation of holography has a more fundamental impact in new imaging modalities that have been impossible or impractical in analog versions. Once a hologram is acquired and stored in a computer as an array of complex numbers that represent the amplitude and phase of the optical fields, the hologram can be numerically manipulated in highly flexible and versatile manners.

While digital holography has been used in various scientific contexts, it has not been implemented to capture color images of scenes illuminated by incoherent light. If the requirement of coherent illumination can be removed, it would open doors to a wide range of new applications, including holography of scenes illuminated with ordinary light sources such as day light, room light, LEDs, etc. Holographic imaging could be effectively applied to all areas of common photography. Many areas of scientific imaging, from fluorescence microscopy to astronomical telescopy, that have been inaccessible to holography because of coherent illumination requirement, can now benefit from many powerful and versatile holographic imaging and processing techniques.

BRIEF DESCRIPTION OF THE DRAWINGS

The present disclosure may be better understood with reference to the following figures. Matching reference numerals designate corresponding parts throughout the figures, which are not necessarily drawn to scale.

FIG. 6B is a mobile phone camera image of the toy boat for comparison.

DETAILED DESCRIPTION

As described above, digital holography has been applied to various scientific applications but has not been applied to other applications, such as capturing color holographic images of scenes illuminated by incoherent light. As described herein, three-dimensional, full-color images of objects under incoherent illumination can be obtained using a color digital holography technique. Color holographic images can be generated based on self-interference of two beam-split copies of the object's optical field with differential curvatures. In some embodiments, the images can be captured using an apparatus comprising a beam-splitter, mirrors, a mirror actuator, lenses, and a color light sensor. No lasers or other special illuminations are required.

Described in the disclosure that follows are systems and methods for performing incoherent digital holography to produce full-color holograms of scenes illuminated by incoherent (e.g., natural) light. The systems and methods are based on self-interference with differential curvature. In some embodiments, two mirrors of different curvatures are used to generate two copies of the object field. Superposition of the two copies leads to Fresnel zone pattern interference from each source point. The spatial incoherence of the object points leads to rapid build-up of incoherent background, which is removed by dithering one of the two mirrors in the interferometer, as in phase-shifting digital holography. Several such phase-shifted interference patterns are acquired by a color digital sensor. For example, three RGB color channels can be extracted and separate complex holograms can be independently generated for each channel by arithmetically combining the several frames of each channel. The separate complex holograms can then be combined to form a color complex hologram that comprises three two-dimensional arrays of complex numbers. Numerical propagation can then be performed to any distance to reconstruct the object's optical field and generate a full-color holographic image of the object.

Figure 1:
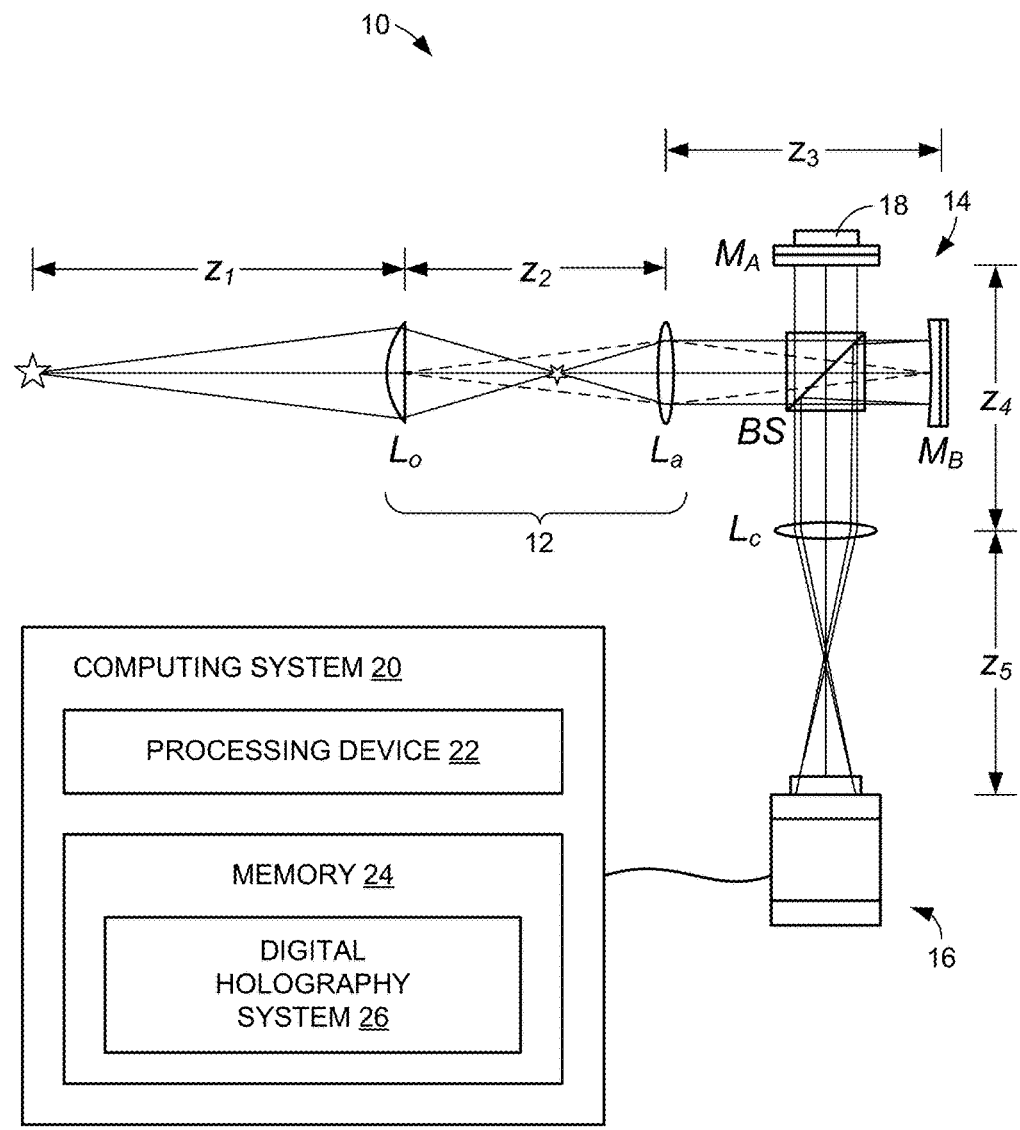
FIG. 1 is a schematic diagram of an embodiment of a color self-interference incoherent digital holography (CSIDH) system.

FIG. 1 illustrates an example color self-interference incoherent digital holography (CSIDH) system 10 that can be used to generate full-color holographic images in the manner summarized above. As shown in FIG. 1, the system 10 generally comprises an optical system 12, an interferometer 14, a color light sensor 16, and a computing system 20. In some embodiments, one or more of those components can be contained within an integrated digital holographic camera.

As shown in FIG. 1, the optical system 12 is represented by an objective lens $L_o$ and a relay lens $L_a$ that together form an intermediate image in front of the interferometer 14. In some embodiments, the lenses $L_o$ and $L_a$ can have 25 cm and 10 cm focal lengths, respectively. While only these two lenses are shown in FIG. 1, it will be appreciated that the optical system 12 could comprise further lenses.

The interferometer 14 includes a beam splitter BS and two mirrors $M_A$ and $M_B$. In the illustrated embodiment, mirror $M_A$ is a planar mirror while $M_B$ is a curved (concave) mirror. It is noted, however, that each mirror can be curved as long as they do not have the same curvature. In some embodiments, the mirror $M_B$ has a focal length $f_B$ of approximately 60 mm. The mirror $M_A$ is mounted to a linear actuator 18, such as a piezoelectric actuator, that can adjust the position of the mirror along the optical axis for phase shifting (dithering). In some embodiments, the actuator 18 is capable of nanometer-scale adjustment of the mirror $M_A$.

The interferometer 14 further includes an imaging lens $L_e$ that focuses the waves reflected by the mirrors $M_A$ and $M_B$ onto a color light sensor 16. In some embodiments, the lens $L_e$ has a focal length of approximately 10 cm. The light sensor 16 can comprise a color charge-coupled device (CCD) or other color light detector. By way of example, the light sensor 16 can have 1024×768 pixels, a 4.76×3.57 mm sensor area, and 8-bit pixel depth. The three color channels of the sensor 16 can have sensitivity peaks near 620 nm, 540 nm, and 460 nm for the red, green, and blue channels, respectively. By way of example, the distances in FIG. 1 can be $z_2 \simeq 35$ cm, $z_3 = z_4 = z_5 \simeq 20$ cm.

During operation of the system 10, the objective lens $L_o$ forms an intermediate image of the object field in front of the interferometer 14. The relay lens $L_a$ is used to image the input pupil onto the mirrors $M_A$ and $M_B$, achieving the requirement of z'=0. The imaging lens $L_e$ is used, in combination with $L_o$, to adjust the magnification and resolution of the system 10.

With further reference to FIG. 1, the computing system 20 generally comprises a processing device 22 and memory 24 (i.e., a non-transitory computer-readable medium) that stores digital holography system 26 that includes one or more algorithms (i.e., logic). As is described below, image data, such as color interference patterns captured by the sensor 16, can be provided to the computing system 20 for processing including the generation of full-color digital holograms of the object field.

Figure 2:
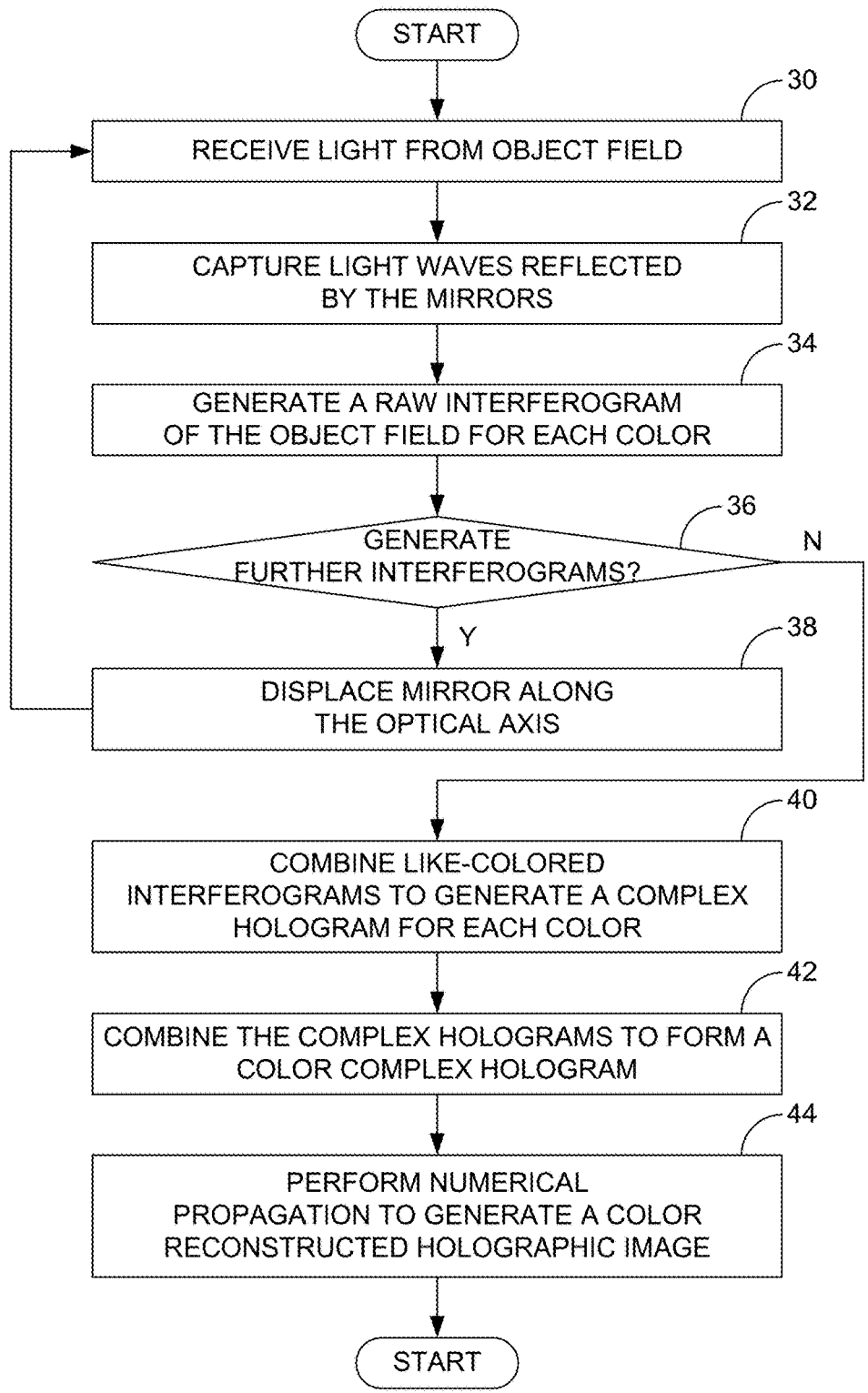
FIG. 2 is a flow diagram an embodiment of a method for performing CSIDH to generate a color digital holographic image.

FIG. 2 is a flow diagram that describes an example method of CSIDH using a system similar to that shown in FIG. 1. Beginning with block 30 of FIG. 2, light from an object field is received by an interferometer from an optical system. In some embodiments, the optical system an interferometer comprise part of a digital holographic camera. Turning to block 32, the light waves that are reflected by the mirrors of the interferometer are captured. In some embodiments, the waves can be reflected by a planar mirror $M_A$ and a curved mirror $M_B$. In other embodiments, the waves can be reflected by a two curved mirrors having different radii of curvature, and therefore different focal lengths. Irrespective of the nature of the mirrors, the light reflected by the mirrors is captured by a color light sensor, such as a color CCD. The light waves can have been split by a beam splitter of the interferometer to provide copies of the waves to both mirrors. The light waves reflected by the mirrors interfere with each other and form an interference pattern, which can be captured by the color light sensor.

The interference can be used to generate interferograms of the object field. More particularly, the interference can be used to generate interferograms for each color of the color light sensor. These interferograms can be output from different channels of the color light sensor with each channel pertaining to a different color of the object field. For example, the sensor can output red interferograms, blue interferograms, and green interferograms. In such a case, a raw interferograms can be simultaneously generated for each color, as indicated in block 34.

With reference next to decision block 36, flow from this point depends upon whether further interferograms are to be obtained. Assuming that further interferograms are to be obtained, flow continues to block 38 and one of the mirrors (e.g., the planar mirror $M_A$) is displaced along the optical axis of the system for purposes of phase shifting. The distance that the mirror is displaced can be very small. By way of example, the mirror can be displaced approximately 1 to 650 nm. Such fine movement can be obtained using a precise actuator, such as a piezoelectric actuator.

Once the mirror $M_A$ has been displaced, flow returns to block 30 and the above-described process is repeated so that further interferograms are generated. In some embodiments, a different number of interferograms can be obtained for different colors. For example, in some cases, eight interferograms can be obtained from the red channel, seven interferograms can be obtained from the green channel, and six interferograms can be obtained from the blue channel to account for the different wavelengths of the colors. In such a case, eight total exposures can be performed.

With reference again to decision block 36, once the desired number of interferograms has been obtained, flow continues to block 40 at which like-colored interferograms are combined to generate a separate complex hologram for each color channel. This process can be performed by a computing system, such as the computing system 20 shown in FIG. 1. Once the complex holograms have been generated for each color channel, they can be combined to form a color complex hologram, as indicated in block 42. This also can be performed by the computing system. In some embodiments, the color complex hologram is represented as a separate amplitude and phase of the optical field.

At this point, numerical propagation can be performed to generate a color reconstructed holographic image, as indicated in block 44.

Figure 3:
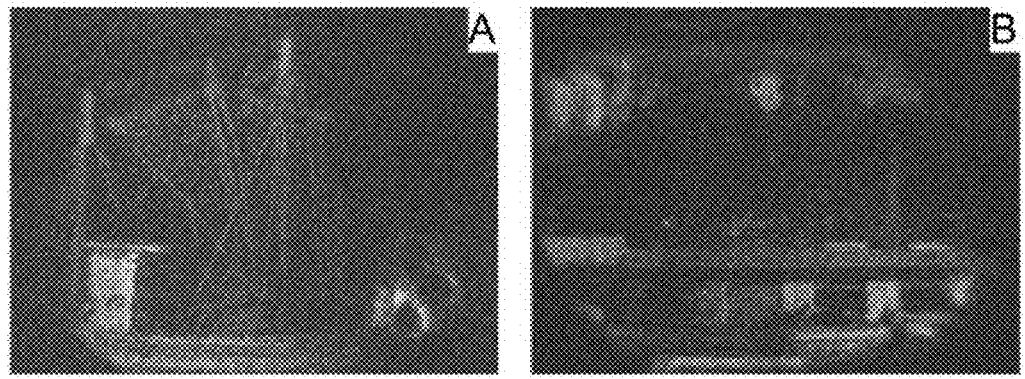
FIG. 3A is an example CSIDH image of a toy boat under halogen lamp illumination.
FIG. 3B is an example CSIDH image of an outdoor scene under daylight illumination.
Figure 4:
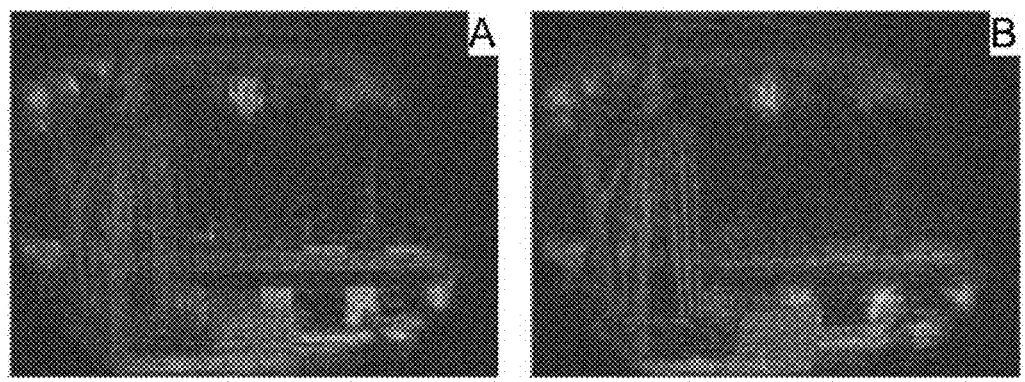
FIG. 4A is an example CSIDH image of a scene focused on distant buildings in the scene.
FIG. 4B is an example CSIDH image of the scene of FIG. 4A while focusing on a toy boat in the foreground.

Two examples of CSIDH are presented in FIG. 3. In FIG. 3A, a toy boat and a die are illuminated with a miniature halogen lamp. Many of the details of the boat, including the masts and the net, are reproduced, although the high red content of illumination tends to give an orange-red overall appearance. Focusing on different parts of the structure has been observed when the reconstruction distance is varied. In FIG. 3B, the holographic camera was pointed at a scene outside a window in clear daylight. The red roof building is slightly out of focus, while the storage building with garage doors is in better focus. These structures were estimated to be at distances of about 1.0 and 0.5 km, respectively, and the field of view was about three degrees. To demonstrate the three-dimensional content of the holographic images, FIG. 4 shows another example of the daylight outdoor scene plus the toy boat placed in front of the window and illuminated with a halogen lamp. The two images were reconstructed at different distances from the same stored complex hologram. In FIG. 4A, the storage building is clearly in focus and the boat is out of focus. Conversely, in FIG. 4B, the boat is clearly in focus and the distant buildings are out of focus. Several additional images are presented below, including detailed sets of intermediate images generated at various steps of the holographic acquisition and processing.

Figure 5:
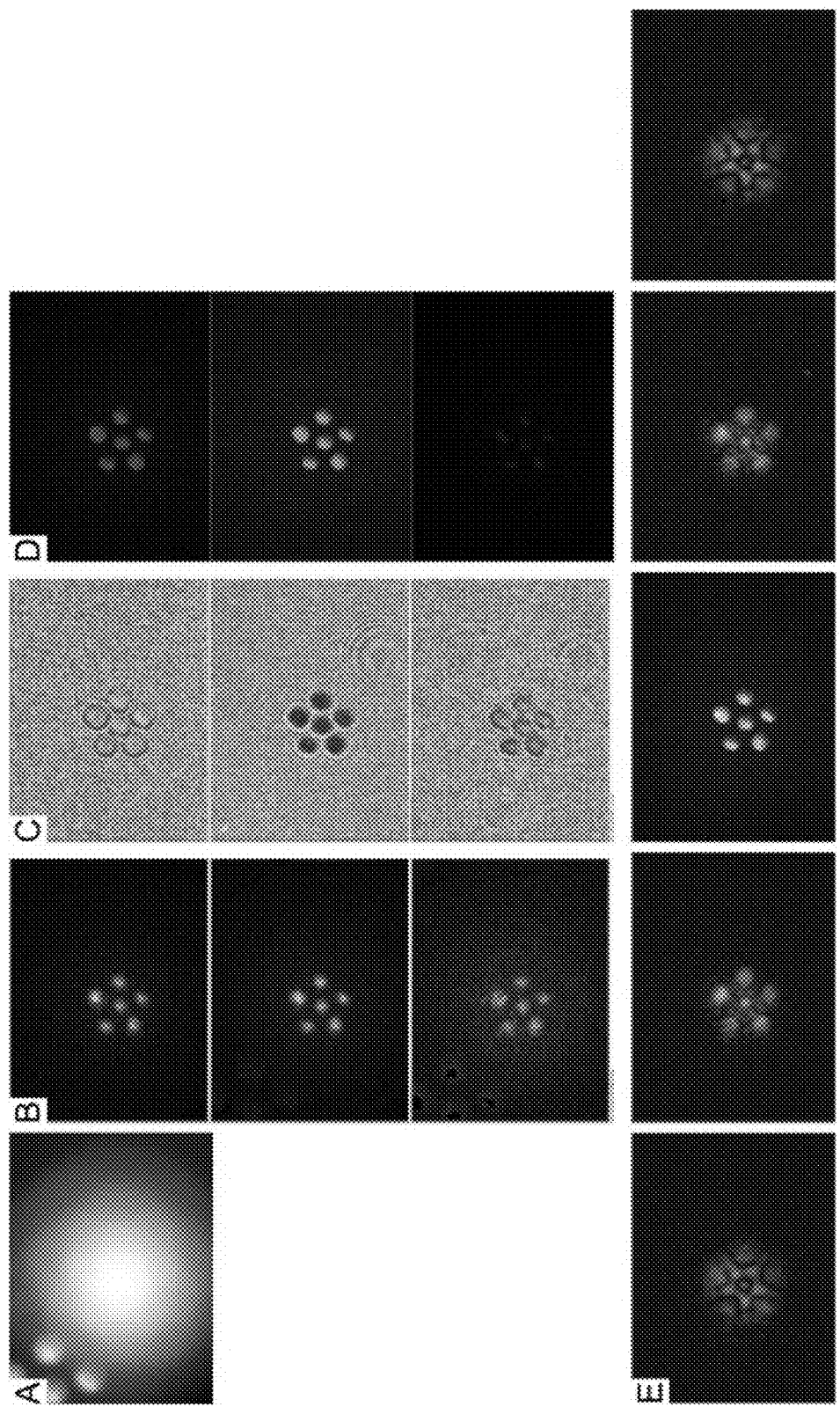
FIG. 5A is an image of a flash light captured by a CCD camera.
FIG. 5B is a panel of images that show the amplitude of a complex hologram of the flash light for red, green, and blue channels.
FIG. 5C is a panel of images that show the phase of the complex hologram of the flash light for the red, green, and blue channels.
FIG. 5D is a panel of numerically focused images from the hologram of the flash light for the red, green, and blue channels.
FIG. 5E is a panel of full-color holographic images of the flash light focused at five distances (−40, −20, 0, +20, +40 mm) from the best focal distance in the hologram space, which was 30 mm.

Example procedures for acquiring and reconstructing holographic images using a system such as that shown in FIG. 1 will now be described with the example of a white LED flashlight in FIG. 5. In order to obtain interference, first the distances of the two mirrors $M_A$ and $M_B$ are matched, for example, using a single LED for better visibility. FIG. 5A shows an image of the six-LED flash light captured by the CCD sensor. When the phase-shifting piezo-mount is dithering, one can discern the existence of interference in the center area of the large circular haze, but with just six LEDs, the background is already large and the fringe visibility quite low. The bright spots on the upper left of FIG. 5A are the result of a stray reflection from the beam-splitter. They do not contribute to the interference or to the final holographic images. A ramp voltage is applied to the piezo-mount with sufficient amplitude to cover more than $2\pi$ of phase shift. The camera frame rate or the piezo ramp rate is adjusted so that N exposures are made over the $2\pi$ excursion. The complex hologram is calculated from the N intensity exposures $I_n$ by $$H = \sum_{n=0}^{N-1} I_n \exp(2\pi i n/N)/2.$$

A difficulty in phase-shifting for tri-color holography is the difference in wavelengths of the three color channels and, therefore, in the necessary piezo-shifts. Noting that the wavelength peaks of the CCD sensitivity has close to 620:540:460≈8:7:6 ratio, eight frames from a series of $I_n$ are used to calculate the $H_R$ for the red channel, and seven and six frames, respectively, are used for the green, and blue channels. The amplitude and phase of the complex holograms that were acquired for the red, green, and blue channels are respectively represented in the panels of FIG. 5B and FIG. 5C. These represent the starting optical field at the hologram plane. Numerical propagation to the image plane results in the image of the object for each channel. This is shown in the panel of FIG. 5D. These images can then be combined to form the full-color image, shown in the center of the panel of FIG. 5E. The image distance is given by a combination of the z distances and the focal lengths identified above in relation to FIG. 1. Numerical propagation to a range of distances around the focal distance demonstrates the focusing property of the holographic image.

Figure 6:
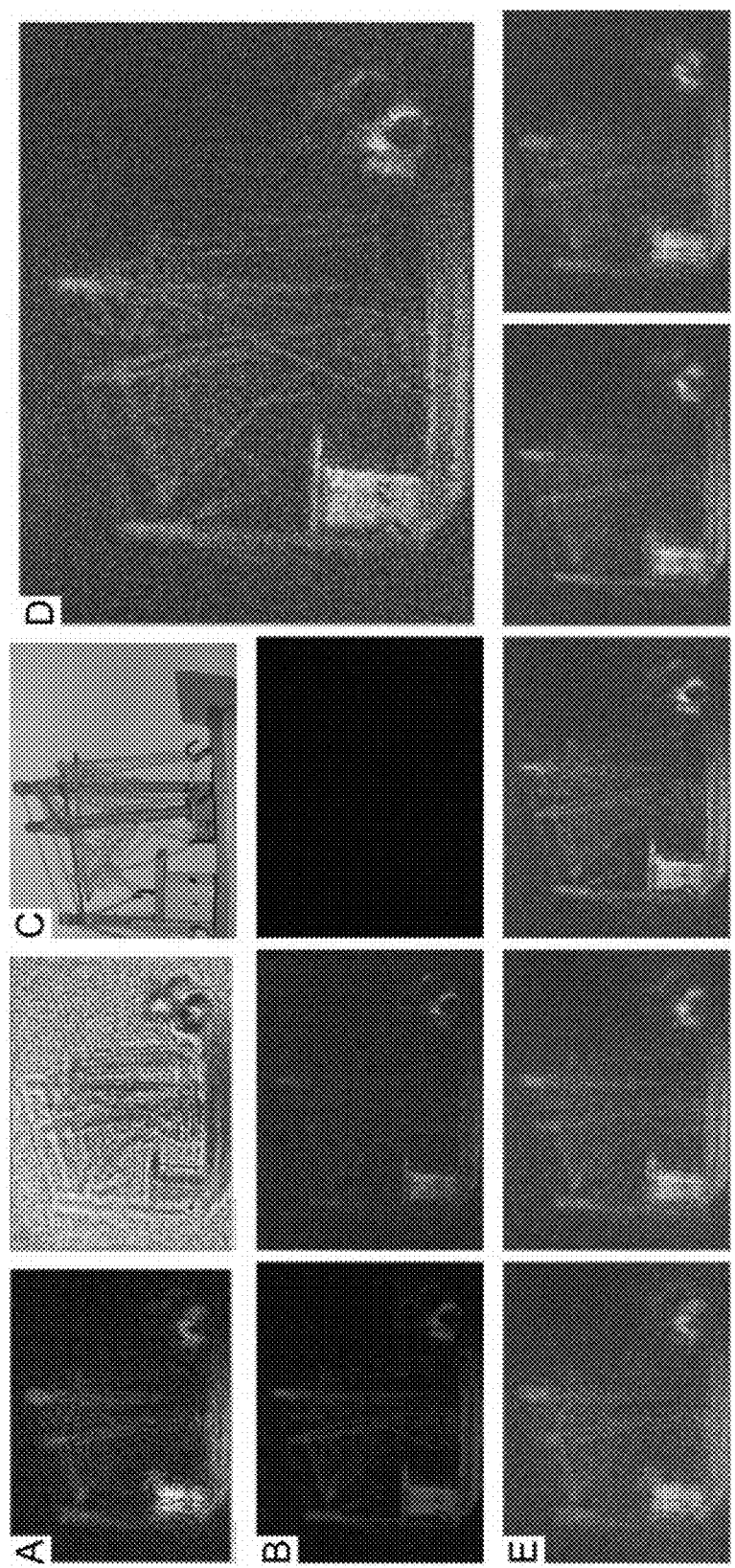
FIG. 6A is a panel of images that show the amplitude and phase of a hologram of a toy boat for the red channel.
FIG. 6B is a panel of numerically focused images from the hologram of the toy boat for the red, green, and blue channels.
FIG. 6D is a full-color focused holographic image of the toy boat.
FIG. 6E is a panel of full-color holographic images of the toy boat focused at five distances (−40, −20, 0, +20, +40 mm) from the best focal distance in the hologram space, which was 30 mm.
Figure 7:
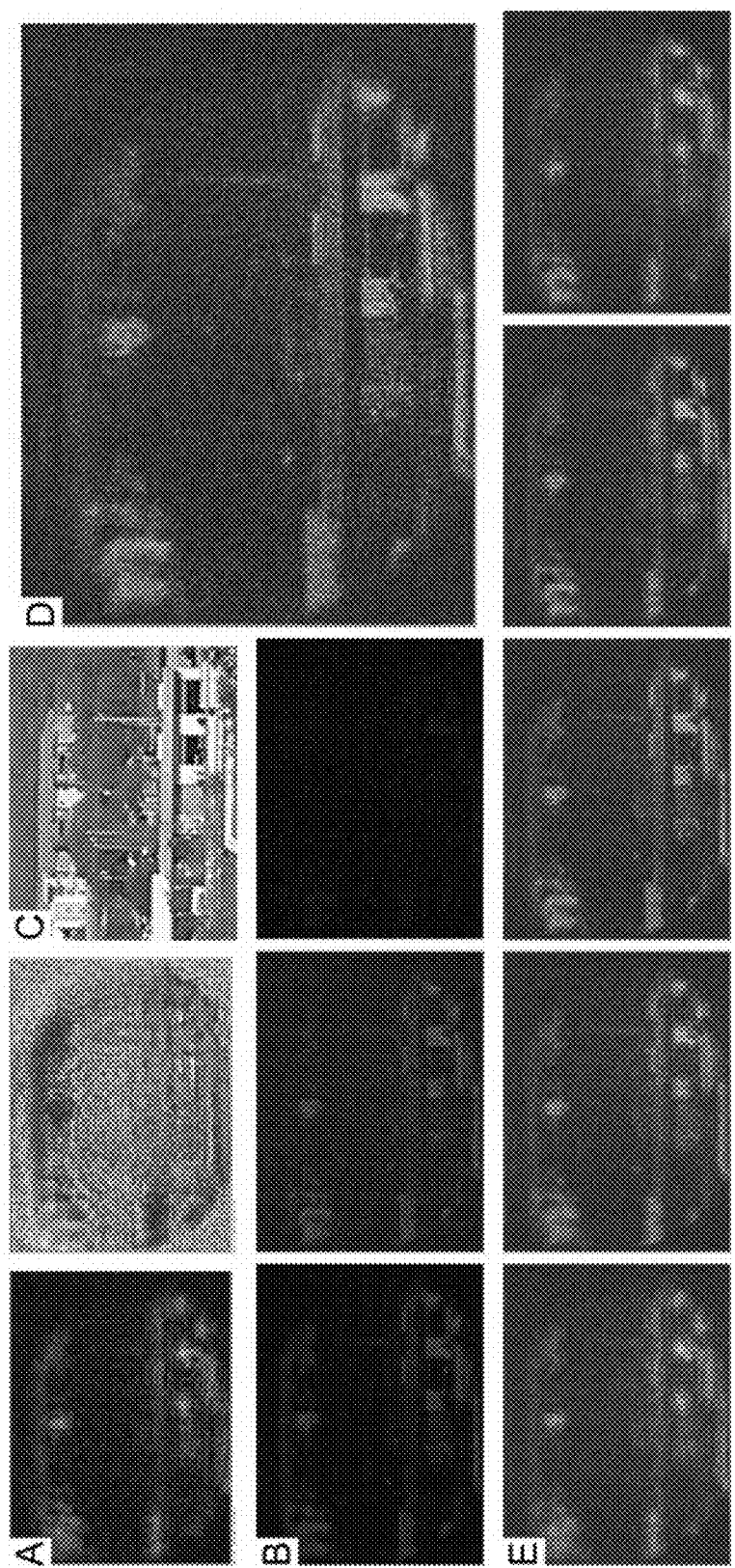
FIG. 7A is a panel of images that show the amplitude and phase of a holograph of an outdoor scene under clear daylight illumination for the red channel.
FIG. 7B is a panel of numerically focused images from the hologram of the outdoor scene for the red, green, and blue channels.
FIG. 7C is a mobile phone camera image of the outdoor scene for comparison.
FIG. 7D is a full-color focused holographic image of the outdoor scene.
FIG. 7E is a panel of full-color holographic images of the outdoor scene focused at five distances (−40, −20, 0, +20, +40 mm) from the best focal distance in the hologram space, which was 30 mm.

Further examples of CSIDH are presented in relation to FIGS. 6 and 7. In FIG. 6, the object is a toy boat that is about 5 cm tall that was placed about 1 m from the front lens of the apparatus, under illumination of a miniature halogen lamp. A die was also present in front of the boat. The complex hologram for the red channel was acquired as described above and is shown in FIG. 6A. The numerically focused images for the three color channels are shown in the panel of FIG. 6B. These images were combined to form the RGB color image, which is shown in FIG. 6D. Many of the details of the boat, including the masts and the net, are reproduced. Focusing on different parts of the structure has been observed when reconstruction distance is varied. For comparison, a cell phone camera picture of the toy boat is shown in FIG. 6C. The red content of the halogen lamp gives the image an overall orange-red tint. As a rudimentary means of color balance, each color frame was multiplied by a factor to equalize the frame averages of the three channels. Also, all three channels were multiplied by a factor to maintain the overall brightness to a desired level. These were only performed for the purpose of adequate rendering of the final images. The panel of FIG. 6E shows the holographic image as focused at five distances −40, −20, 0, +20, +40 mm from the best focal distance in the hologram space, which was 30 mm. The center image of the panel of FIG. 6E is a copy of the image of FIG. 6D.

A similar set of figures is shown in FIG. 7, in which case the holographic camera was turned toward an outdoor scene visible through an office window. The day was clear and the camera was directed at an apartment building with red roof and a storage building with garage doors. The apartment building is slightly out of focus in the image of FIG. 7D, while the storage building is in better focus. These structures were estimated to be at distances of about 1.0 and 0.5 km, respectively, and the field of view was about three degrees.

The above disclosure demonstrates the feasibility of full-color natural light holographic three-dimensional imaging. As proof-of-principle examples, the images are not yet perfect and some of the technical issues can be mentioned. To avoid vignetting and to image a larger field of view, the interferometer can be configured more compactly, which should also improve the signal strength. The signal strength, however, should more directly increase with the bit depth of the CCD pixels, e.g., 12 bits instead of 8 bits, in order to extract weak interference fringes against large background. The lens and mirror systems were not presently optimized for best resolution. As with most color cameras, the color rendering is imperfect and subject to somewhat arbitrary adjustments, but the examples do clearly demonstrate the ability to distinguish different colors with plausible consistency. A more important issue for improving the chromatic and overall performance is in the phase shifting. In the above examples, the phase shifts were only approximate and rather inefficient for the three color channels. Still the overall performance of this early prototype appears quite robust against some of these deficiencies.

Using a simple optical apparatus including a beam splitter, a piezo-mounted plane mirror, a curved mirror, and a few lenses, together with a color light sensor and straightforward algorithms, three-dimensional holographic images are recorded and reconstructed under natural light illumination and with full color rendition. The simplicity of the principle suggests possible extensions in non-optical regions of the electromagnetic spectrum, such as in THz, x-ray, as well as electron holography, where the beam-splitter-plus-two-mirror interferometer may be replaced with half-transparent Fresnel zone plates for these wavelengths. Three or more of the zone plates can be fabricated for phase-shift acquisition. A more immediate application is a consumer-level holographic color camera in basically a point-and-shoot configuration. In this respect, this holographic camera can be compared with a system known as light-field camera, which is based on integral imaging principle using a lenslet array placed in front of the CCD sensor. In comparison with a light-field camera, the holographic camera has no loss of resolution due to the lenslets and the computational load will be substantially lighter. Incoherent light holographic cameras, such as proposed here, have real potential to make holographic three-dimensional imaging as common as photography in all areas of imaging from microscopy to astronomy, as well as in engineering, artistic, and general public uses. More significantly, a large array of powerful holographic techniques developed for coherent imaging systems may now be applicable to incoherent imaging systems.

The invention claimed is:

1. A method for generating a color holographic image, the method comprising:
   (a) using an interferometer to generate an interferogram of an object field illuminated with incoherent light for each of multiple colors, the interferometer comprising first and second mirrors that reflect light from the object field, wherein the mirrors have different radii of curvature;
   (b) displacing the first mirror along an optical axis of the interferometer to perform phase shifting;
   (c) sequentially repeating steps (a) and (b) until multiple phase-shifted interferograms are generated for each color;
   (d) combining like-colored phase-shifted inteferograms to generate a separate complex hologram for each color;
   (e) combining the separate complex holograms to obtain a color complex hologram; and
   (f) generating a reconstructed color holographic image of the object field.

2. The method of claim 1, wherein the phase-shifted interferograms are captured with a color light sensor.

3. The method of claim 1, wherein generating a reconstructed color holographic image comprises performing numerical propagation on the color complex hologram.

4. A system for generating color holographic images, the system comprising:
   an optical system that collects incoherent light from an object field;
   an interferometer that receives the light collected by the optical system, the interferometer including a first mirror, a second mirror, a beam splitter configured to send copies of the received light to each of the mirrors, wherein the mirrors have different radii of curvature;
   a color light sensor that receives light waves reflected by each of the mirrors of the interferometer and generates separate interferograms each of multiple different colors from the interfering light waves; and
   a computing system that executes a digital holography system configured to receive the interferograms from the inteferometer and generate color holographic images of the object field based upon the interferograms.

5. The system of claim 4, wherein one of the mirrors is planar and the other mirror is curved.

6. The system of claim 4, wherein one of the mirrors is displaceable along an optical axis of the interferometer.

7. The system of claim 6, wherein the interferometer further comprises an actuator adapted to axially displace the first mirror along the optical axis.

8. The system of claim 7, wherein the actuator is a piezoelectric actuator.

9. The system of claim 4, wherein the color light sensor is a color charge-coupled device having separate red, green, and blue channels.

10. The system of claim 4, wherein the digital holography system is configured to combine the interferograms to form separate complex holograms for each color and then combine the separate complex holograms together to generate a color complex hologram.

11. The system of claim 10, wherein the digital holography system is further configured to perform numerical propagation on the color complex hologram to generate a color holographic image.

* * * * *